March 19, 1968            J. A. KLOTZ            3,374,341
METHOD FOR CONTROLLING PRESSURE DIFFERENTIAL RESULTING FROM
FLUID FRICTION FORCES IN WELL-DRILLING OPERATIONS
Filed Nov. 26, 1963
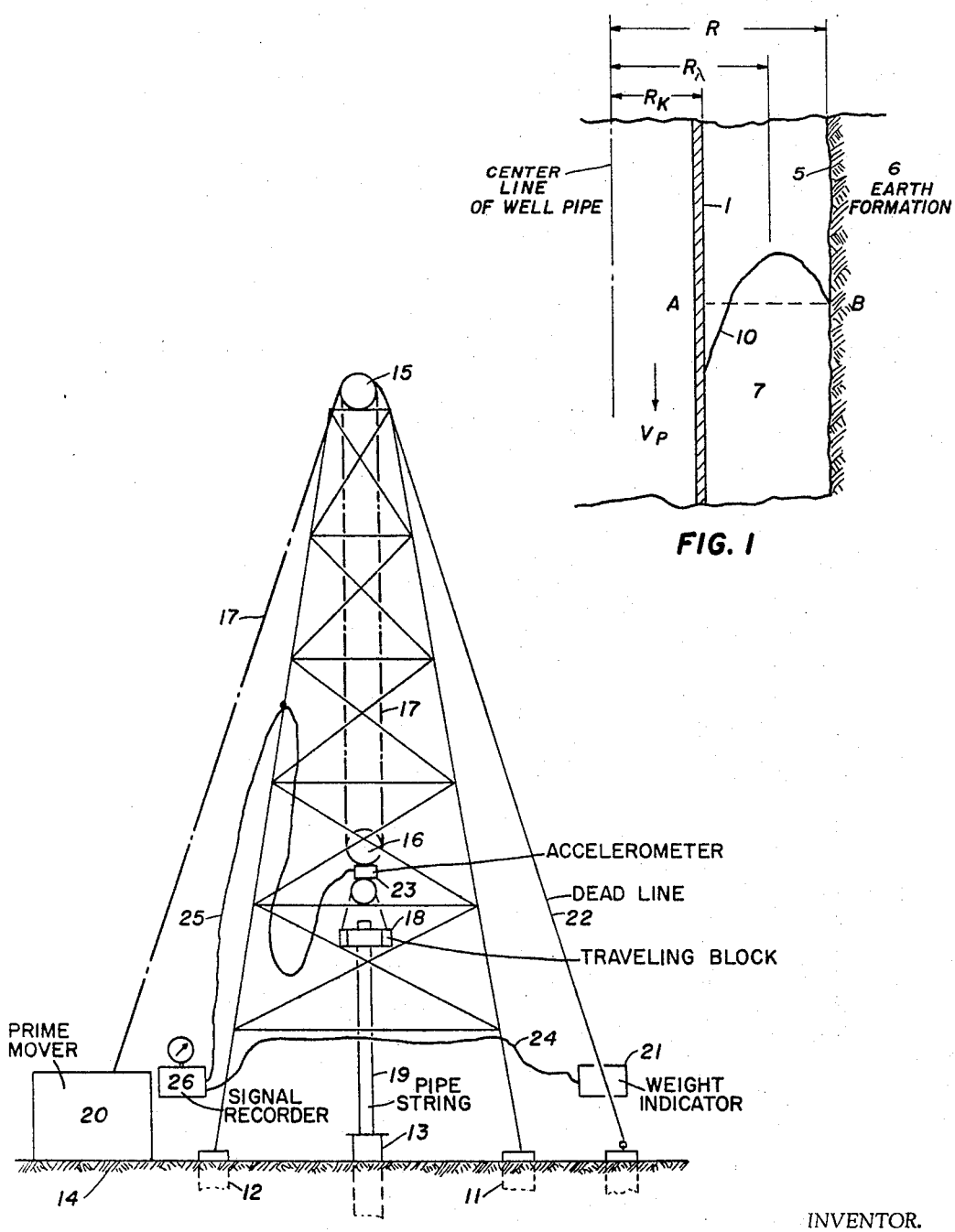
INVENTOR.
JAMES A. KLOTZ United States Patent Office 3,374,341
Patented Mar. 19, 1968

3,374,341
METHOD FOR CONTROLLING PRESSURE DIFFERENTIAL RESULTING FROM FLUID FRICTION FORCES IN WELL-DRILLING OPERATIONS
James A. Klotz, Crystal Lake, Ill., assignor, by mesne assignments, to Union Oil Company of California, Los Angeles, Calif., a corporation of California
Filed Nov. 26, 1963, Ser. No. 325,850
6 Claims. (Cl. 235—193)

ABSTRACT OF THE DISCLOSURE

The fluid friction forces resulting from the movement of a body vertically through a column of liquid cause a pressure differential above or below the corresponding hydrostatic pressure of the liquid column. In various applications, such as the drilling of well bores into subterranean earth formations, direct measurement of this pressure differential is difficult; yet, in many applications, the pressure differential must be controlled within relatively close limits. This invention provides a method for controlling the pressure differential caused by the passage of a body through a vertical column of liquid below a predetermined value based on measurements external of the liquid column.

---

This invention relates to a method and apparatus for determining the positive and negative pressure surges that occur in an elongated column of liquid during periods in which the volume of said liquid is changing due to the immersion of an object therein. More particularly this invention relates to a method and means for detecting pressure surges (both positive and negative) that occur in a column of liquid in a well bore, such as drilling mud or other well fluid, as drilling equipment, such as drill pipe or casing, is run into or pulled from a deep well.

It is known in the art of well drilling and production that pressure surges and anomalies in a well bore constitute a problem relative to mud losses, blowouts and stuck drilling equipment. Studies of pipe motion curves have been made for drill pipe lowered at certain velocities and depths in a well bore filled with drilling mud to determine the bottom-hole pressures or pressure changes as the pipe is accelerated or decelerated therein. Prior investigators have determined that the pressures, or changes in pressure, caused by the motion of the pipe are linear between the bottom of the drill string and the top of the hole. It has also been determined that pressure increases as high as those which can be calculated cannot in fact occur, because the exposed formations will fracture, and mud losses will take place at lower total pressures. Pressure reductions tend to be relieved by gas, oil or water flowing into the bore hole from exposed formations, and the elasticity of the formations tends to dampen or lessen the pressure surges.

The determination of the safe minimum and maximum pressures above and below mud-column hydrostatic pressure can be determined from the velocity and acceleration of the drill string during lowering and raising operations in the well. By simultaneously mathematically relating these determined values through a computer to various characteristics of the well, the equipment, and the well fluids, an estimate of the bottom hole pressure changes can be obtained. Safe operation of the well is assured by maintaining the velocity and acceleration of the drill string within the so established safe limits. In accordance with the instant invention, the decrease or increase in the weight of the drill string or the relative force required for its movement in the fluid column, together with the dimensions and fluid friction characteristics of the column are used to estimate pressure diminution or increase, respectively, within the fluid column.

Accordingly, it becomes a primary object of this invention to provide a method and means for determining the pressure surges that occur in a column of fluid, due to changing relative volume at various depths therein, by measuring the relative buoyancy of a moving object therein which causes the change in volume, and relating the change in buoyancy to the maximum and minimum pressure changes to be tolerated by the system. Other objects of this invention will be described or become apparent as the specification proceeds.

FIGURE 1 is a drawing illustrating the relative velocity of fluid particles outside a well pipe as same is being moved in the liquid in a well.

FIGURE 2 is a schematic showing the installation of the equipment at a drilling rig to illustrate one embodiment of this invention.

This invention and the development of the mathematical concepts thereof are illustrated as follows.

As drill pipe, tubing, or casing is run into a deep well, fluid in the well is caused to flow upward out of the well. This flow is accompanied, as in any fluid flow, by a corresponding pressure change. This pressure change depends upon flow rates, fluid properties, and roughness of pipe wall and well wall, as well as upon linear velocity of the pipe within the fluid. Conversely, a pressure change in the other direction will occur when pipe is pulled from a well.

In oil wells, these pressure changes may be great enough to upset critical balances between (1) hydrostatic pressure at the bottom of the column of drilling mud and pressure of reservoir fluids; and (2) hydrostatic mud pressure and the pressure required to fracture, i.e., cause tensil cracks, the rock formations forming the well bore. For example, typical pressures in a well drilled in the Louisiana Gulf Coast area might be as follows:

|  | P.s.i.g. |
|---|---|
| Pressure of reservoir gas at 10,000' | 7500 |
| Pressure in well bore that will fracture formation at 9000' | 7000 |

If hydrostatic pressure at 10,000 ft. in the drilling mud column falls below 7500 p.s.i.g., gas will enter the well bore and aerate the mud column, thus causing further pressure reduction, and the well will blow-out. On the other hand, if the mud column pressure at 9000 ft. exceeds 7000 p.s.i.g., the well walls will fracture and mud will flow into the resulting cracks. Such lost circulation may be expensive to correct and loss of drilling mud may also lead to a blow-out.

Such a well could be drilled with a mud having an average density of 110 lbs./ft.$^3$. Hydrostatic pressure in a column of this mud would be:

6874 p.s.i.g. at 9000' and
7638 p.s.i.g at 10,000'.

Then, each time drill pipe or casing was run into this well, pipe movement velocity would have to be controlled so that the positive pressure surge at 9000' did not exceed 7000—6874=126 p.s.i., and each time pipe was pulled, its velocity would have to be controlled so that the negative pressure surge did not exceed 7638—7500=138 p.s.i In ordinary drilling operations, no good methods are available for measuring bottom hole pressures directly. This invention provides, however, a method for estimating these pressure surges by means of measurement of the forces required to move the pipes.

Consideration of (1) force required to move pipe, (2) fluid friction shear forces, and (3) well bottom pressure, leads to the following relationship:

$$\Delta P = f/\pi R^2 \lambda^2$$

In this equation, $\Delta P$ is defined as the magnitude of pressure surge or the change in pressure associated with pipe movement exclusive of hydrostatic pressures; $f$ is the fluid friction force; $\pi = 3.141592$; R is the well bore radius; and $\lambda$ is a dimensionless number defined so that $\lambda R$ is the radius in the fluid at which linear velocity of mud fluid particles is a maximum.

The sketch shown as FIGURE 1 illustrates these, showing a half-cross-section of pipe 1 in a well bore having wall 5 in earth formation 6. The pipe 1, having radius $R_k$, closed at the bottom for maximum pressure effect, moves downward at a velocity $V_p$. Fluid 7 in the well is forced to flow upward. Velocity of the fluid 7 varies with radius, as shown approximately by curve 10. At the pipe wall, fluid is dragged downward along with the pipe; here, fluid velocity equals $V_p$ or that of the pipe. At the well wall 5, fluid velocity is zero. At points closer to the pipe wall than the intersection of curve 10 and the horizontal dashed line A–B (which indicates zero velocity), the fluid 7 moves downward with the pipe. At points closer to the well wall than this intersection, fluid 7 flows upward, and maximum upward velocity is at radius $R\lambda$.

The value for $\lambda$ can be determined by consideration of the well radius, R, the pipe radius, $R_k$, and fluid properties. This consideration leads to the relationship:

$$\lambda^2 = -\frac{2D}{E}$$

D and E are further defined as follows:

$$D = \int_\lambda^1 \rho \int_\rho^1 (\rho - \lambda^2/\rho)^s d\rho \cdot d\rho + \int_k^\lambda \rho \int_k^\rho (\lambda^2/\rho - \rho)^s d\rho \cdot d\rho$$

$$E = \int_\lambda^1 \rho - \lambda^2/\rho)^s d\rho - \int_k^\lambda (\lambda^2/\rho - \rho)^s d\rho$$

In these definitions of D and E, $\lambda$ and $k$ are as previously defined. $\rho$ is defined as a dimensionless number such that $R\rho$ is the radius at any point within the fluid system. The exponent, $s$, describes the degree of non-Newtonianness of the fluid. According to the generally accepted "power law" description of non-Newtonian fluids, (Ref.: Wilkinson, Non-Newtonian Fluids, Pergamon Press, N.Y. (1960)).

Shear stress = constant $x$ (shear rate)$^{1/s}$
$s = 1.0$ for Newtonian liquids The net force on the hook or traveling block supporting a pipe string that is being run into a well or pulled from the well is the resultant of three forces:

(1) Net weight of the pipe at rest as it is buoyed by the well fluid.
(2) Acceleration forces.
(3) Fluid friction forces.
Net pulling force will be (1)+(2)+(3);
Net running force will be (1)−(2)−(3).

Normal drilling weight indicators measure the net forces continuously, and they can be used to measure the static buoyed weight of the pipe. A commercial linear accelerometer can be attached to the hook and instrumented to determine the acceleration forces. Then the fluid frictinon forces can be determined and related to bottom hole surge pressure. A skilled instrument technician could readily arrange a weight indicator and an accelerometer so that the fluid friction forces are indicated directly.

FIGURE 2 is referred to in order to illustrate a specific arrangement to be used to make the measurements of acceleration and weight during either the upward or downward movement of the pipe string as the method of this invention is applied to drilling an oil well. In FIGURE 2 a derrick is shown held by means of footings 11 and 12 in position over casing 13 representing a typical well bore in earth 14.

Top pulley 15 and bottom pulley 16 form a block and tackle arrangement with cable 17 supporting traveling block 18 attached to pipe string 19, the same being lowered or raised in casing 13 by means of prime mover 20. A weight indicator 21 is attached to drilling dead line 22, and an accelerometer 23 is attached between traveling block 18 and pulley 16. These instruments are attached by means of wires, hydraulic or pneumatic tubes 24 and 25, respectively, to recording instrument 26, depending on the principle of operation of devices 21 and 23.

In operation, the weight indicator 21 will transmit a signal to recorder 26 which is proportional to the buoyed pipe weight while the pipe is motionless and at the same time the accelerometer will transmit a zero signal. At this point a "null" and "tare" reading can be made. Then, as the pipe is moved, either up or down, the weight indicator 21 will continue to transmit a signal proportional to the net pipe weight which will be recorded on instrument 26, and the accelerometer will transmit a signal proportional to accelerative forces, up or down.

Pipe movement rates can then be controlled by the driller to prevent fluid friction forces calculated as fluid friction force = net moving pipe weight
— tare weight ± accelerative forces where + applies during running pipe; — applies during pulling pipe.

In order to illustrate the invention the following example is given:

Example 1

Suppose a 10,000 ft. deep well is drilled with a diameter $R = 9$ inches. Pressure considerations are such that maximum allowable surge pressure at a 9000′ depth is 200 p.s.i. above the hydrostatic pressure. Drill pipe diameter is 4.5 inches and the drilling fluid is water (a Newtonian fluid, $s = 1.0$). In accordance with this invention the upward force on the drill pipe as it is run into the hole at a rate corresponding to the maximum permissible 200 p.s.i. surge is determined as follows:

The equation $$\lambda^2 = -2D/E$$

reduces to $$\lambda^2 = \lambda^2 = \frac{k^3 + 1}{2}$$

where $$k = 4.5/9.0 = 0.5$$

Then $$\lambda^2 = 0.625$$

Then $$f = \Delta P \pi (R\lambda)^2$$

$$f = 200 \text{ p.s.i.} \times 1.59 \text{ in.}^2$$

$$f = 318 \text{ lbs.}$$

In accordance with this invention, the pipe is run in at a rate such that the indicated weight does not decrease more than 318 lbs. below the static weight of the drill string in the hole.

The embodiments of the invention in which an exclusive property or privilege is claimed are defined as follows:

1. A method for controlling the pressure differential in a column of liquid caused by the vertical movement of a body through the liquid, which comprises:
measuring the static weight of said body at rest in the liquid;
moving said body vertically through the liquid;
measuring the net apparent weight of said body as it moves vertically through the liquid;

measuring the acceleration force acting on said body as it moves vertically through the liquid; and adjusting the vertical velocity of said body within the liquid to maintain the differential pressure of the liquid caused by the movement of the body therethrough less than a predetermined value, the pressure differential of the liquid being determined by the relationship $$\Delta P = f/\pi R^2 \lambda^2$$

wherein $f$ is the fluid friction force acting on the body as determined by the algebraic sum of the net apparent weight of the moving body and the acceleration force less the static weight of the body, $\pi$ is the constant 3.141592, R is the radius of the liquid column, and $\lambda$ is a dimensionless number defined so that $\lambda R$ is the radius in the liquid at which the linear velocity of the liquid is a maximum.

2. The method in accordance with claim 1 in which $\lambda$ is determined from the relationship $$\lambda^2 = -\frac{2D}{E}$$

wherein $$D = \int_\lambda^1 \rho \int_\rho^1 (\rho - \lambda^2/\rho)^s d\rho \, d\rho + \int_k^\lambda \rho \int_\lambda^\rho (\lambda^2/\rho - \rho)_s d\rho \, d\rho$$

and E is $$\int_\lambda^1 (\rho - \lambda^2/\rho)^s d\rho - \int_k^\lambda (\lambda^2/\rho - \rho)^s d\rho$$

wherein $\rho$ is a dimensionless number such that $R\rho$ is the radius at any point in the liquid column having radius R, $s$ is the degree of non-Newtonianness of the fluid, and $k$ is the liquid column radius.

3. The method in accordance with claim 1 in which the net apparent weight of said moving body and the acceleration force acting on said body are measured continuously.

4. The method in accordance with claim 1 in which a first signal proportional to the net apparent weight of said moving body and a second signal proportional to the acceleration force are transmitted to a recorder unit which continuously indicates the pressure differential.

5. A method for controlling the pressure differential caused by the vertical movement of a body through a well bore containing a column of liquid, which comprises:
   measuring the static weight of said body at rest in the liquid;
   moving said body vertically through the liquid;
   measuring the net apparent weight of said body as it moves vertically through the liquid;
   measuring the acceleration force acting on said body as it moves vertically through the liquid; and
   adjusting the vertical velocity of said body to maintain the pressure differential of the liquid caused by the movement of the body through the well bore below a predetermined maximum value, the pressure differential of the liquid being determined by the relationship $$\Delta P = f/\pi R^2 \lambda^2$$

wherein $f$ is the fluid friction force acting on the body as determined by the algebraic sum of the net apparent weight of the moving body and the acceleration force less the apparent static weight of the body, $\pi$ is the constant 3.141592, R is the radius of the fluid column and $\lambda$ is a dimensionless number determined by the relationship $$\lambda^2 = -\frac{2D}{E}$$

wherein $$D = \int_\lambda^1 \rho \int_\rho^1 (\rho - \lambda^2/\rho)^s d\rho \, d\rho + \int_k^\lambda \rho \int_k^\rho (\lambda^2/\rho - \rho)^s d\rho \, d\rho$$

and E is $$\int_\lambda^1 (\rho - \lambda^2/\rho)^s d\rho - \int_k^\lambda (\lambda^2/\rho - \rho)^s d\rho$$

wherein $\rho$ is a dimensionless number such that $R\rho$ is the radius at any point in the liquid column having radius R, $s$ is the degree of non-Newtonianness of the fluid, and $k$ is the liquid column radius.

6. A method for controlling the pressure differential caused by the vertical movement of a body through a well bore containing a column of liquid, which comprises:
   measuring the static weight of said body at rest in the liquid;
   moving said body vertically through the liquid;
   continuously measuring the net apparent weight of said body as it moves vertically through the liquid;
   continuously measuring the acceleration force acting on said body as it moves vertically through the liquid;
   transmitting a first signal proportional to the net apparent weight of said body and a second signal proportional to the acceleration force acting on said body to a recorder wherein the pressure differential of the fluid caused by the movement of the body through the well bore is recorded, the pressure differential of the fluid being determined by the relationship $$\Delta P = f/\pi R^2 \lambda^2$$

wherein $f$ is the fluid friction force acting on the object as determined by the algebraic sum of the net apparent weight of the body and the acceleration force less the apparent static weight of the body, $\pi$ is the constant 3.141592, R is the radius of the fluid column and $\lambda$ is a dimensionless number defined so that $\lambda R$ is the radius in the fluid at which the linear velocity of the fluid is at a maximum; and
   controlling the vertical velocity of said body in said well bore to maintain the calculated pressure differential below a predetermined maximum value.

References Cited

UNITED STATES PATENTS

| | | | |
|---|---|---|---|
| 2,422,806 | 6/1947 | Silverman et al. | 73—151 |
| 2,696,111 | 12/1954 | Conner | 73—151 |
| 3,022,822 | 2/1962 | McStravick et al. | 166—4 |

FOREIGN PATENTS

| | | |
|---|---|---|
| 687,038 | 5/1964 | Canada. |

MALCOLM A. MORRISON, *Primary Examiner.*

J. F. RUGGIERO, *Assistant Examiner.*